Nov. 24, 1925.  
W. HENNIG  
1,562,766  
STONE GATHERING MACHINE  
Filed July 10, 1924  3 Sheets-Sheet 3
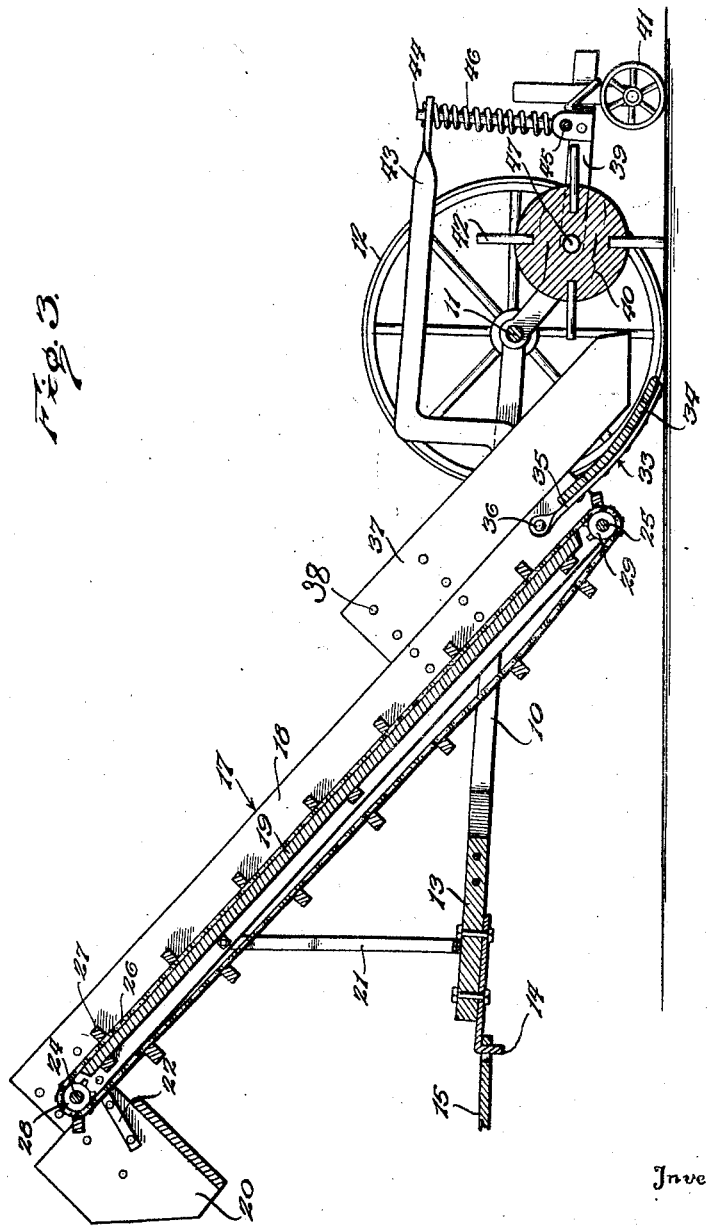

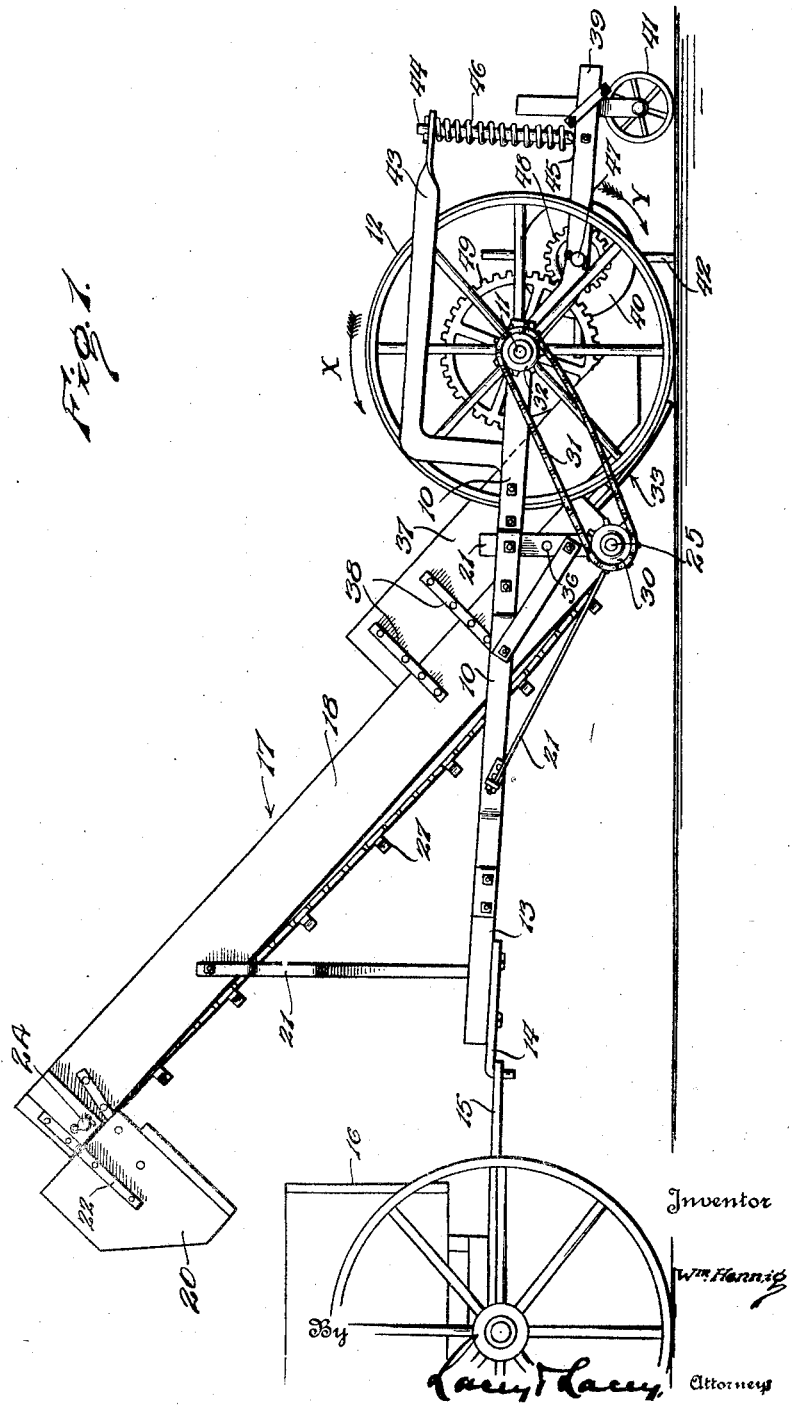

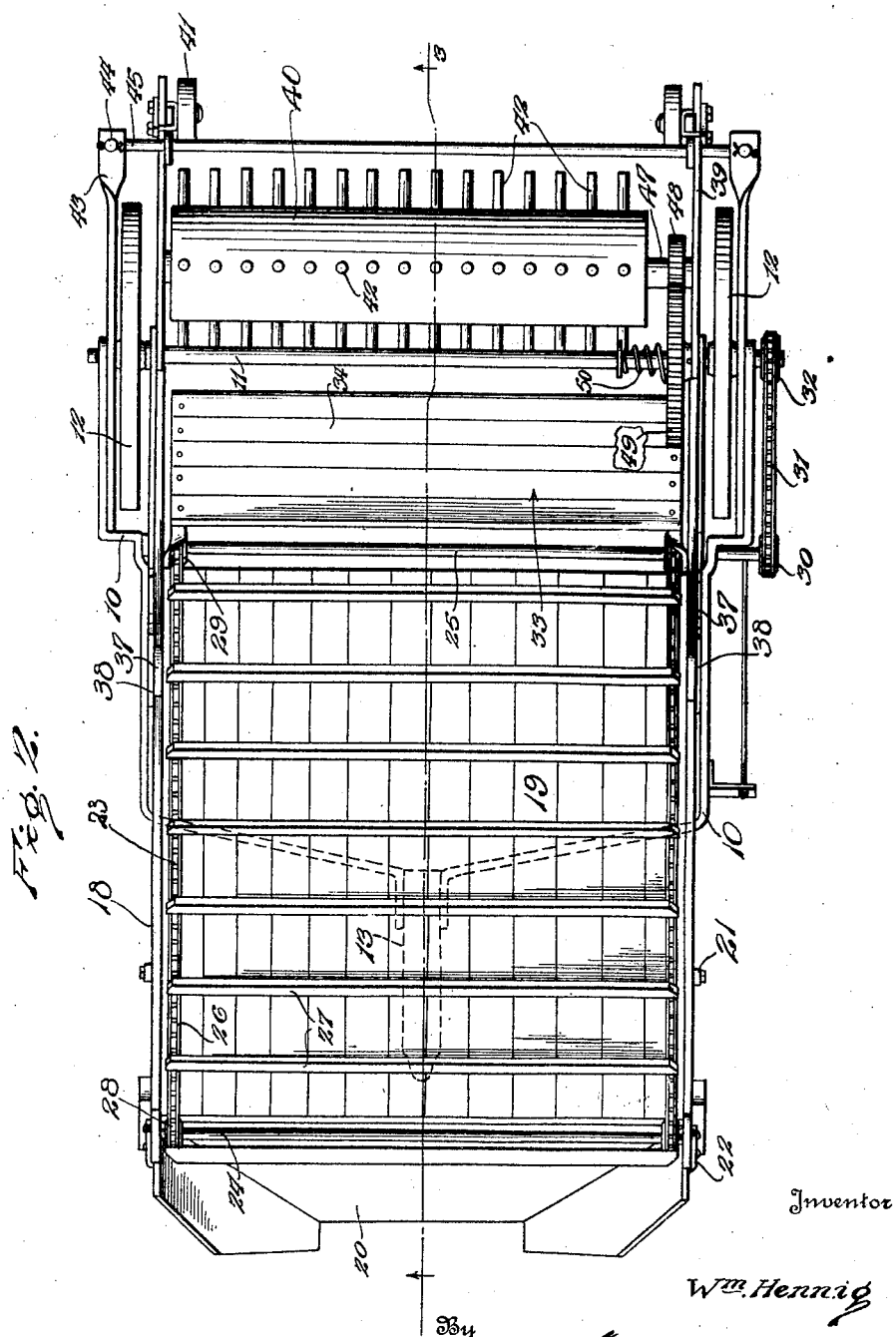

Patented Nov. 24, 1925.

1,562,766

UNITED STATES PATENT OFFICE.

WILLIAM HENNIG, OF ATHENS, WISCONSIN.

STONE-GATHERING MACHINE.

Application filed July 10, 1924. Serial No. 725,164.

*To all whom it may concern:*

Be it known that I, WILLIAM HENNIG, a citizen of the United States, residing at Athens, in the county of Marathon and State of Wisconsin, have invented certain new and useful Improvements in Stone-Gathering Machines, of which the following is a specification.

My investigation relates to a machine for gathering and removing stones from a plowed and harrowed field. The machine is adapted to be drawn by a tractor or horses over the field when it will pick up stones any size from a walnut to a cocoanut and throw them on an elevator which will deposit them in an accompanying truck or farm wagon. The characteristics of the machine are a roller and an oscillating frame in which the roller is mounted to revolve, the latter being provided with stone-picking fingers adapted to throw the stones forward to be received by the elevator. The carrier is so mounted on the machine that it will regulate the position of the roller with regard to the profile of the ground. The machine is preferably trailing behind a wagon in which the elevator deposits the stones picked up by the roller.

In the accompanying drawings, one embodiment of the invention is illustrated, and Figure 1 is a side elevation of the machine;

Figure 2 is a top plan view thereof, and

Figure 3 is a section on the line 3—3 of Figure 2.

In the drawings, the reference numeral 10 represents a frame, at the rear end of which is carried a wheel axle 11 for the traction wheels 12, one of which at least is rigidly mounted on the axle. At the forward end of the frame is provided a tongue 13 with a hook 14 or other suitable device for hitching it to an eye 15 at the rear end of a truck 16. Upon the frame 10 is rigidly mounted an elevator 17 consisting of a trough with upstanding side walls 18 and a flat bottom 19. The trough is mounted at an angle of about forty-five degrees upon the frame with its forward end highest at which end a spout 20 is secured and directed downwardly at substantially ninety degrees to the trough. Suitable braces 21 and 22 are provided for the trough and the spout.

In the trough an endless conveyor is carried on an upper spindle 24 and a lower spindle 25 journaled in the trough. Any suitable kind of conveyor may be used but in the drawings, however, a so-called chain rake conveyor has been illustrated consisting of a pair of chains 26 with transversely directed rake bars 27 secured at intervals between the chains. The upper runs of the chains rest upon the bottom 19 of the trough while the lower runs thereof run freely under the bottom. The spindles 24 and 25 are provided with sprocket wheels 28 and 29, respectively, for the chains 26 and a third sprocket wheel 30 is secured on the lower spindle 25 outside of the trough 7. This third sprocket wheel is connected by means of a chain 31 with a fourth sprocket wheel 32 carried on the rear wheel axle 11, as best seen in Figures 1 and 2, and the arrangement is made so that the upper runs of the conveyor chains travel in upward direction in the trough when the machine is drawn forward on the ground and the traction wheels revolve in the direction of the arrow X in Figure 1.

At the lower end of the trough 17 is provided a short platform or tray 33 consisting of a number of narrow boards 34 secured on arms 35 which are pivoted, as at 36, in the side walls 18 of the trough in such a manner that with the lower end of the tray resting on the ground the tray will receive a slight oscillating motion according to the unevenness of the ground. At the lower end of the conveyer are also furnished guides 37 which consist of boards rigidly secured, as by iron straps and rivets 38 on the side walls 18.

On the wheel axle 11 is pivoted a carrier 39 for a stone-picking roller 40. At the rear end of the carrier are furnished trailing wheels 41 adjustably mounted on the carrier in order to regulate the height of the roller 40 above the ground. The roller 40 is preferably made of solid wood into which are driven series of steel pins or fingers 42 which are of sufficient length to barely touch the ground when the traction wheels 12 and the trailing wheels 41 rest thereon. A pair of long arms 43 are rigidly secured on the frame 10, and the rear ends of these arms are adapted to receive the upper end of a pair of rods 44 which are pivoted, as at 45, at their lower ends upon the carrier 39. Between the carrier and the rear ends of the arms 43 are inserted coiled springs 46 wound around the rods 44. By this means constant pressure is exerted by the frame on the carrier in order to hold the latter with the stone-picking roller 40 against the ground.

Upon the shaft 47 of the stone-picking roller 40 is secured a pinion 48 meshing with a gear wheel 49 keyed upon the wheel axle 11 adapted to slide in axial direction thereupon in order to disengage from the pinion 48 when desired. A spring 50 tends to hold the gears in mesh.

When the machine is to be used upon the field which has been plowed or harrowed, it is hitched behind the wagon 16 drawn by horses or a tractor. In traveling forward the gears 48 and 49 will then cause the stone-picking roller 40 to revolve in clockwise direction, as indicated by arrow Y in Figure 1, while the traction wheels revolve in counterclockwise direction, as indicated by arrow X in said figure. When the steel pins or fingers 42 encounter a stone, they will dislodge the same from the ground and throw the same forwardly with sufficient force to drop the stone between the slats or rake bars 27 on the bottom 19 of the elevator trough. In case a stone be not thrown forward with sufficient force, it will drop on the tray and as the latter is downwardly inclined in the direction of the roller 40 the stone will roll down the tray in front of the fingers 42 on the roller and will again be picked up by the same and thrown forward. As the upper run of the conveyor has an upward direction toward the spout, the collected stones will be carried to the upper end of the elevator and dumped from the spout 20 into the preceding truck 16 and collected therein. In case the roller 40 encounters a large stone or a rock firmly held in the ground, the carrier 39 will permit the roller to travel over the same to be again pressed down against the ground as soon as the obstruction has been passed.

The roller 40 is shown with four rows of steel pins or fingers 42 but it is evident that any other number may be selected. The gearing between the wheel axle 11 and the roller shaft 47 is so selected that the roller revolves at a considerably greater speed than the wheels 12.

Having thus described the invention, I claim

1. In a machine of the class described, a wheeled frame, a carrier mounted to oscillate on the frame, a stone-picking member mounted to revolve in the carrier, positive gearing connection between the frame wheels and the stone-picking member, an elevator carried by the frame in position to receive stones thrown by said member, and a tray interposed between the member and the elevator and pivotally mounted on the elevator.

2. In a machine of the class described, a wheeled frame, a carrier mounted to oscillate on the frame, a stone-picking member mounted to revolve in the carrier, positive gearing connection between the frame wheels and the stone-picking member, an elevator carried by the frame in position to receive stones thrown by said member, and trailer wheels on the carrier.

3. In a machine of the class described, a wheeled frame, a carrier mounted to oscillate on the frame, a stone-picking member mounted to revolve in the carrier, positive gearing connection between the frame wheels and the stone-picking member, an elevator carried by the frame in position to receive stones thrown by said member, and trailer wheels adjustably mounted on the carrier.

4. In a machine of the class described, a wheeled frame, a carrier mounted to oscillate on the frame, a stone-picking member mounted to revolve in the carrier, positive gearing connection between the frame wheels and the stone-picking member, an elevator carried by the frame in position to receive stones thrown by said member, trailer wheels adjustably mounted on the carrier, and means on the frame tending to press the trailer wheels against the ground.

5. In a machine of the class described, a wheeled frame, a carrier mounted to oscillate on the frame, a stone-picking member mounted to revolve in the carrier, positive gearing connection between the frame wheels and the stone-picking member, an elevator carried by the frame in position to receive stones thrown by said member, the elevator including a trough having open top and ends, sprocket wheels at each end of the trough, chains running over the sprocket wheels, spaced slats connecting the chains, and driving connection between the sprockets and the traction wheels of the machine.

6. In a machine of the class described, a wheeled frame, a carrier mounted to oscillate on the frame, a stone-picking member provided with radial fingers mounted to revolve in the carrier, positive gearing connection between the frame wheels and the stone-picking member, an elevator carried by the frame in position to receive stones thrown by said member, trailer wheels adjustably mounted on the carrier, and means on the frame tending to press the trailer wheels against the ground.

7. In a machine of the class described, a wheeled frame, a carrier mounted to oscillate on the frame, a stone-picking member provided with radial fingers mounted to revolve in the carrier, positive gearing connection between the frame wheels and the stone-picking member, an elevator carried by the frame in position to receive stones thrown by said member, trailer wheels adjustably mounted on the carrier, means on the frame tending to press the trailer wheels against the ground, the elevator including a trough having open top and ends, sprocket wheels at each end of the trough, chains running over the sprocket wheels, spaced slats connecting the chains, and driving connection between the sprockets and the traction wheels of the machine.

In testimony whereof I affix my signature.

WILLIAM HENNIG. [L. S.]